United States Patent
Kondou et al.

(10) Patent No.: US 7,779,622 B2
(45) Date of Patent: Aug. 24, 2010

(54) POST INJECTION CONTROL OF INTERNAL COMBUSTION ENGINE

(75) Inventors: Terunori Kondou, Yokohama (JP); Jin Yokoyama, Hino (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 515 days.

(21) Appl. No.: 11/637,242

(22) Filed: Dec. 12, 2006

(65) Prior Publication Data

US 2007/0137179 A1 Jun. 21, 2007

(30) Foreign Application Priority Data

Dec. 14, 2005 (JP) ............... 2005-360463

(51) Int. Cl.
*F01N 3/00* (2006.01)
(52) U.S. Cl. ............... 60/286; 60/285; 60/295; 60/297; 123/299; 123/300; 123/305
(58) Field of Classification Search ............ 60/274, 60/285, 286, 295, 297, 299, 300; 123/299, 123/300, 305
See application file for complete search history.

(56) References Cited

U.S. PATENT DOCUMENTS

| | | | | |
|---|---|---|---|---|
| 6,314,935 B2 * | 11/2001 | Tanaka et al. | ............... | 123/298 |
| 6,370,869 B1 * | 4/2002 | Hirota et al. | ............... | 60/276 |
| 6,536,209 B2 * | 3/2003 | Fluga et al. | ............... | 60/284 |
| 6,666,020 B2 * | 12/2003 | Tonetti et al. | ............... | 60/286 |
| 6,758,037 B2 * | 7/2004 | Terada et al. | ............... | 60/295 |
| 7,316,107 B2 * | 1/2008 | Aratsuka et al. | ............... | 60/297 |
| 7,415,967 B2 * | 8/2008 | Trask et al. | ............... | 123/435 |
| 2006/0283425 A1 | 12/2006 | Tsutsui et al. | | |

FOREIGN PATENT DOCUMENTS

| | | |
|---|---|---|
| DE | 19746855 A1 | 4/1999 |
| EP | 0974747 A2 | 1/2000 |
| EP | 1524425 A1 | 4/2005 |
| JP | 8-254151 (A) | 10/1996 |
| JP | 2002-371900 A | 12/2002 |
| JP | 2003-97331 (A) | 4/2003 |
| JP | 2004-183491(A) | 7/2004 |
| JP | 2004-316441 (A) | 11/2004 |
| JP | 2005-76559 (A) | 3/2005 |

* cited by examiner

*Primary Examiner*—Binh Q Tran
(74) *Attorney, Agent, or Firm*—Foley & Lardner LLP

(57) ABSTRACT

In an engine (10) comprising a fuel injector (12) which performs a post injection after performing a main injection into a cylinder and an exhaust valve (15) which opens and closes to discharge an exhaust gas, a controller (70) controls the fuel injector (12) to start the post injection during a period where a gas velocity in the cylinder along a cylinder axis increases after the exhaust valve (15) opens. A duration (t) of the post injection is controlled according to a crank angle at which the post injection is to be performed such that a breakup distance (L) at the end of which the injected fuel atomizes does not become larger than a distance (S) from an injection hole (12a) to a cylinder liner (10c), thereby ensuring that the injected fuel is supplied to an exhaust passage (23) without adhering to the cylinder liner (10c).

2 Claims, 9 Drawing Sheets

61 DIFFERENTIAL PRESSURE SENSOR
62 DPF INLET TEMPERATURE SENSOR
63 DPF OUTLET TEMPERATURE SENSOR
64 CRANK ANGLE SENSOR

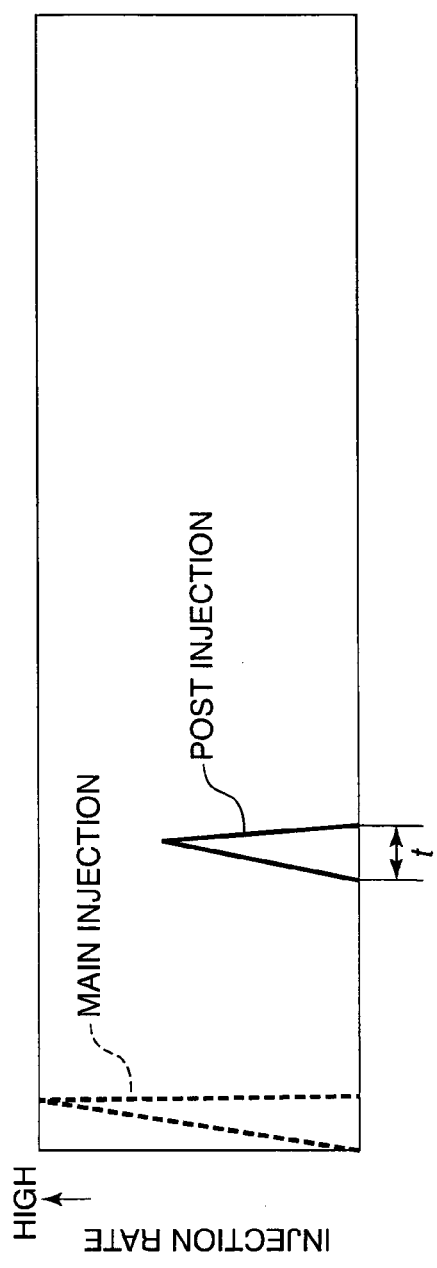
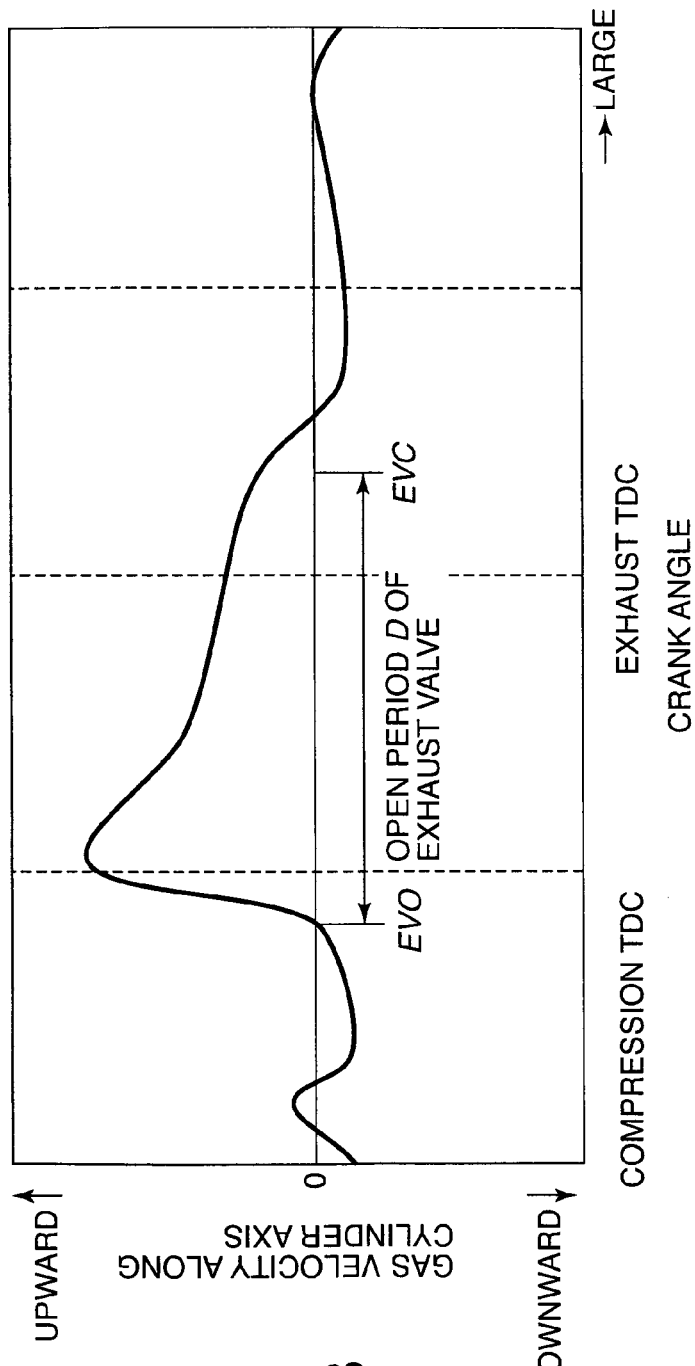
FIG. 5A
FIG. 5B

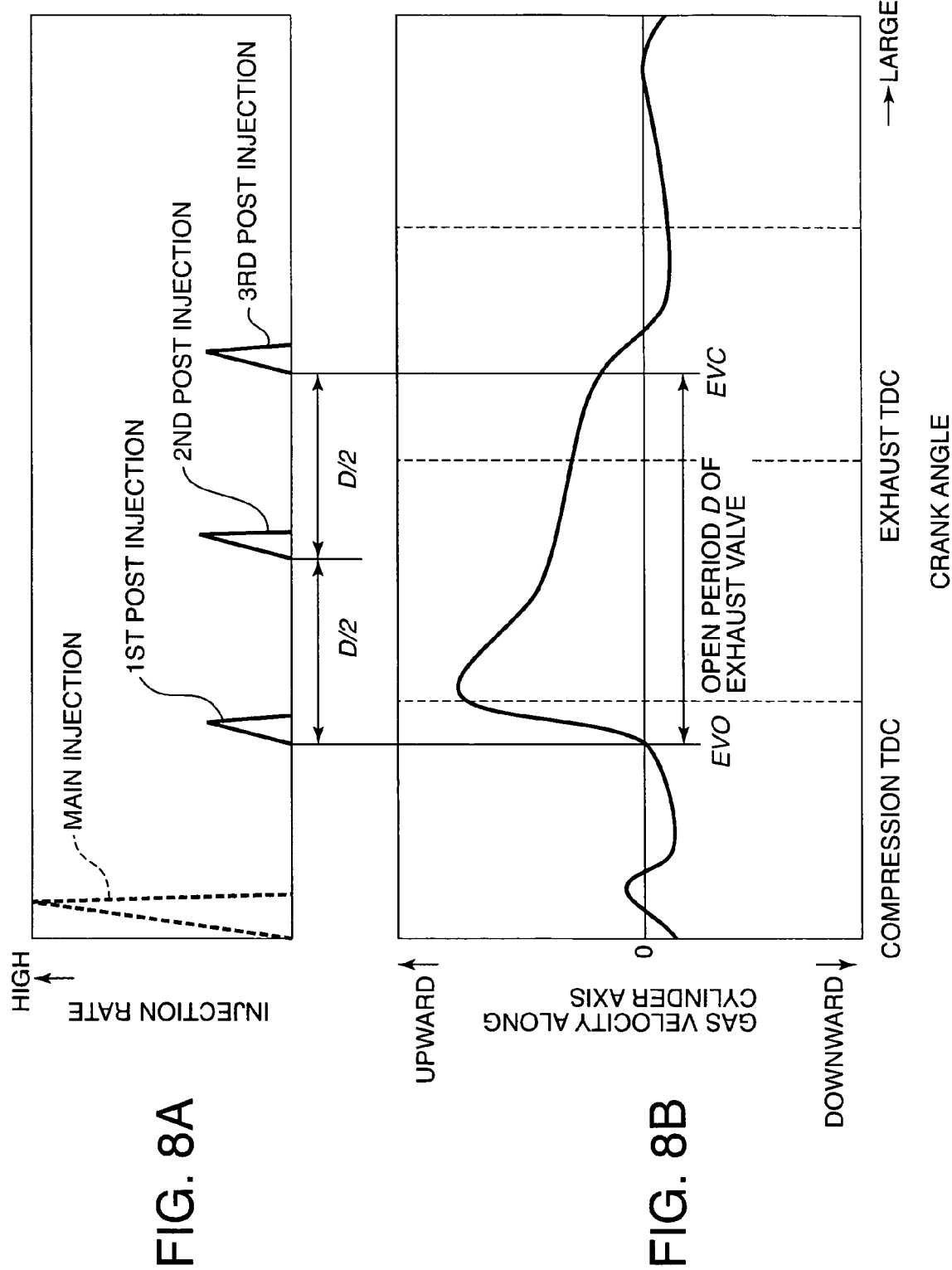

POST INJECTION CONTROL OF INTERNAL COMBUSTION ENGINE

FIELD OF THE INVENTION

This invention relates to post injection control of an internal combustion engine for the purpose of regenerating an exhaust gas filter.

BACKGROUND OF THE INVENTION

A diesel particulate filter (DPF) which is disposed in an exhaust passage of a diesel engine for trapping particulate matter becomes clogged, as it continues to trap particulate matter. When a considerable amount of particulate matter has been deposited in the DPF, the DPF has to be regenerated. The regeneration is accomplished by forcibly burning the deposited particulate matter in the filter by raising the exhaust gas temperature.

JP2002-371900A published by the Japan Patent Office in 2002, proposes causing a fuel injector of the diesel engine to perform a post fuel injection, following a main fuel injection, in a crank angle range of 20 to 45 degrees before exhaust top dead center of a piston which corresponds to the later portion of the exhaust stroke. Then aim of this prior art is to burn the deposited particulate matter in the DPF using a heat generated by after-burning of the fuel injected in the post injection.

SUMMARY OF THE INVENTION

When a post injection amount is increased, the injected fuel tends to adhere to a cylinder liner forming a wall surface of a combustion chamber. When adhered fuel is scraped by the piston and falls into an oil pan located under the piston, engine oil stored in the oil pan may be diluted.

In the later portion of the exhaust stroke of the piston, since the temperature and pressure in the cylinder is low, a part of the fuel adhered to the cylinder liner remains until the following combustion cycle without being vaporized. Combustion of this residual oil may cause an unexpected acceleration of the engine.

It is therefore an object of this invention to prevent the fuel injected by the post injection from adhering to the cylinder liner.

In order to achieve the above object, this invention provides a fuel injection control device for use with an internal combustion engine, wherein the engine comprises a fuel injector which performs a post injection after performing a main injection into a cylinder and an exhaust valve which opens and closes to discharge an exhaust gas. The control device comprises a programmable controller programmed to control the fuel injector to start the post injection during a period in which a gas velocity in the cylinder along a cylinder axis increases after the exhaust valve opens.

This invention also provides a fuel injection control method comprising controlling the fuel injector to start the post injection during a period in which a gas velocity in the cylinder along a cylinder axis increases after the exhaust valve opens.

The details as well as other features and advantages of this invention are set forth in the remainder of the specification and are shown in the accompanying drawings.

BRIEF DESCRIPTION OF THE DRAWINGS

FIGS. 5A and 5B are diagrams showing fuel injections and gas velocity variation along the cylinder axis according to the crank angle of the diesel engine, according to this invention.

FIGS. 8A and 8B are similar to FIGS. 5A and 5B, but show a third embodiment of this invention.

DESCRIPTION OF THE PREFERRED EMBODIMENTS

Figure 1:
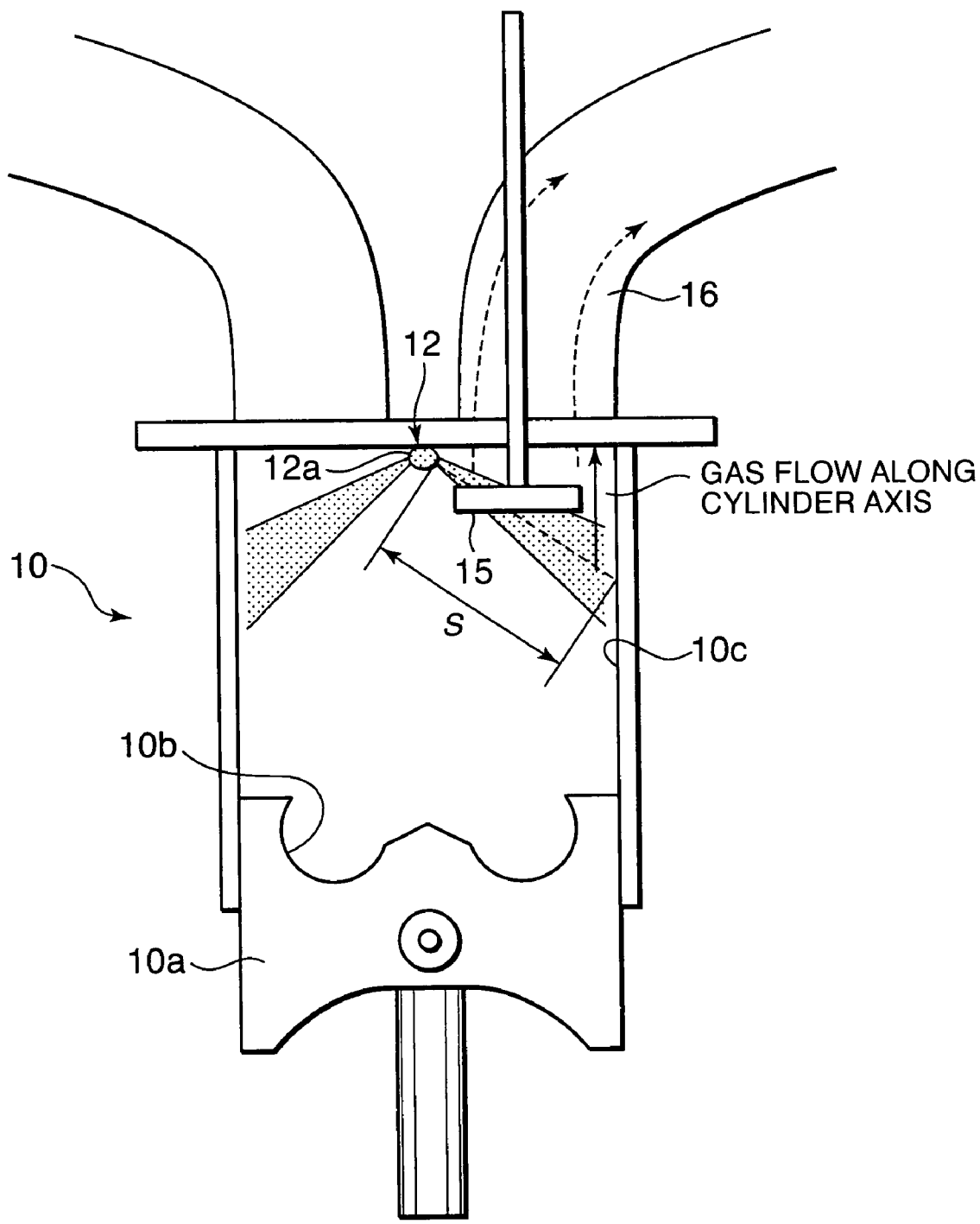
FIG. 1 is a schematic longitudinal sectional view of a diesel engine for the purpose of describing the behavior of injected fuel.

Referring to FIG. 1 of the drawings, first, a research result obtained by the inventors as a basis of this invention will be described.

In a diesel engine, a main fuel injection is performed by a fuel injector 12 in the final stage of a compression stroke of a piston 10a, when the piston 10a has ascended to the vicinity of compression top dead center. When the piston 10a is in an ascended position, the injected fuel is directed toward a cavity 10b formed on the crown portion of the piston 10a.

On the other hand, a post injection is performed at a retarded timing with respect to the main injection timing. According to the prior art, the post injection is performed in a crank angle range of 20-45 degrees before exhaust top dead center of the piston. In this crank angle range, an exhaust valve 15 is open as shown in the figure, and the location of the piston 10a is low and apart from an injection hole 12a of the fuel injector 12. As a result, the injected fuel is directed toward a cylinder liner 10c and tends to adhere thereto.

Figure 2:
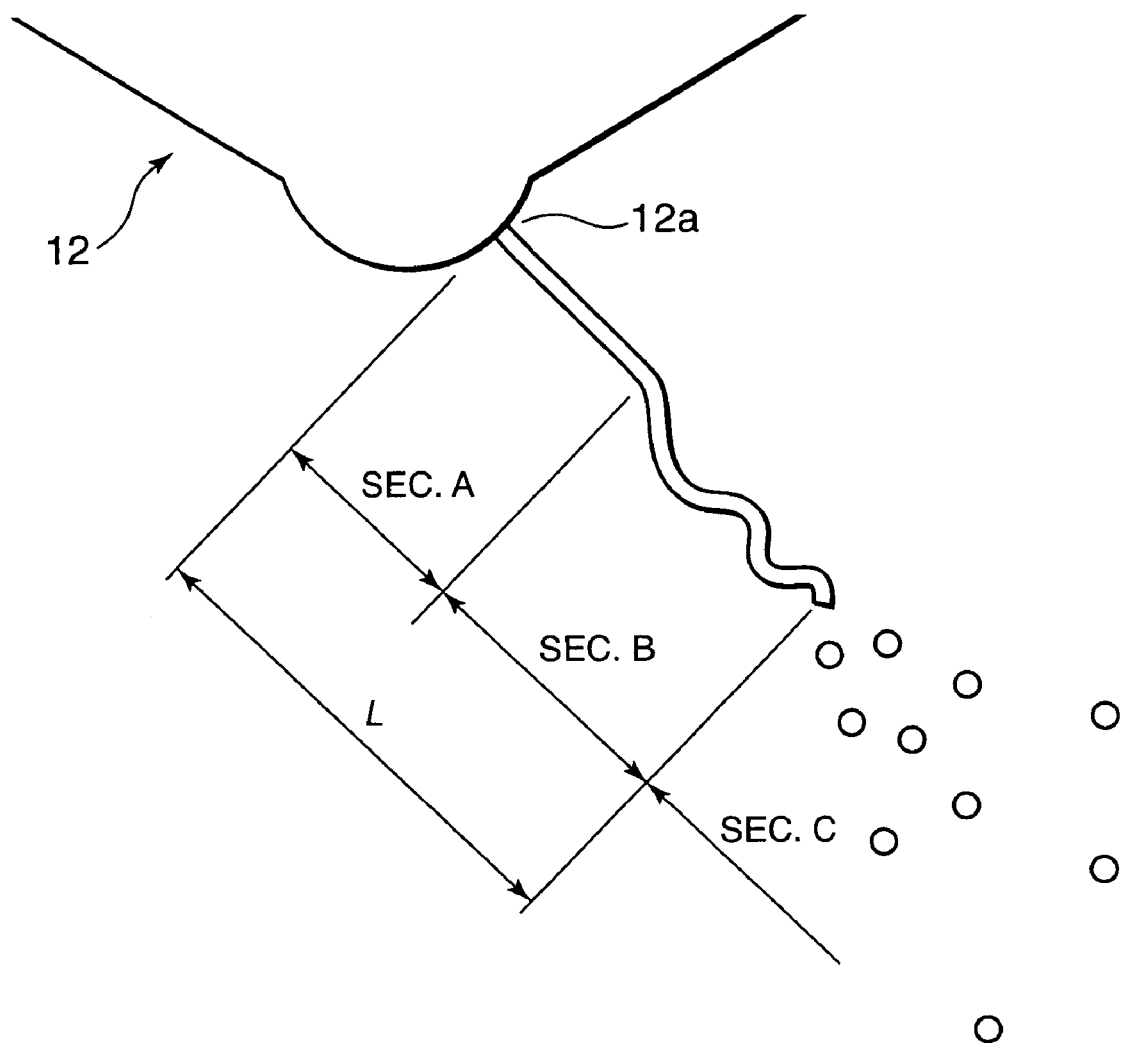
FIG. 2 is a diagram describing atomization of fuel injected by a fuel injector into a cylinder.

Referring to FIG. 2, the fuel injected from the injection hole 12a advances straight ahead in a section A in the vicinity of the injection hole 12a. It then takes a waveform like path in a section B due to friction with air, and then atomizes in a section C. The length from the injection hole 12a to the atomizing position, or in other words the length of a liquid column corresponding to the total length of the sections A and B is named a breakup length L. The breakup length L is logically expressed by the following equation (1).

$$L = C \cdot \sqrt{\frac{2 \cdot \Delta P}{\rho_f}} \cdot t$$

where, L=breakup length;
C=velocity coefficient;
$\Delta P$=differential pressure between interior and exterior of injection hole;
$\rho f$=density of fuel; and
t=duration of post injection.

The velocity coefficient C is a known coefficient which is predetermined through experiments.

From the equation (1), providing that the duration t of the post injection is constant, the breakup length L is proportional to a square root of the differential pressure $\Delta P$ between the interior and exterior of the injection hole 12a. When the fuel pressure of the fuel injector 12 is constant, the differential pressure ΔP becomes smaller as the cylinder pressure increases, and the differential pressure ΔP becomes greater as the cylinder pressure decreases. Accordingly, the breakup length L becomes shorter as the cylinder pressure increases and the breakup length L becomes longer as the cylinder pressure decreases.

Once atomized, hardly any of the injected fuel adheres to the cylinder liner 10c. In contrast, if the injected fuel reaches the cylinder liner 10c in a state of a liquid column, it adheres easily to the cylinder liner 10c. As long as the breakup length L is shorter than a distance S between the injection hole 12a and the cylinder liner 10c measured in the direction of the path of the injected fuel, hardly any of the injected fuel adheres to the cylinder liner 10c, but if the breakup length L is longer than this distance S, the injected fuel adheres to the cylinder liner 10c.

In the prior art, the post injection is performed in the later portion of the exhaust stroke of the piston. During the later portion of the exhaust stroke, both the temperature and pressure in the cylinder are low. The breakup length L of the injected fuel in this state is therefore long, and the injected fuel tends to adhere to the cylinder liner 10c because the combustion chamber is open to an exhaust passage via the exhaust valve 15 and an exhaust port 16, as shown in FIG. 1.

Figure 3:
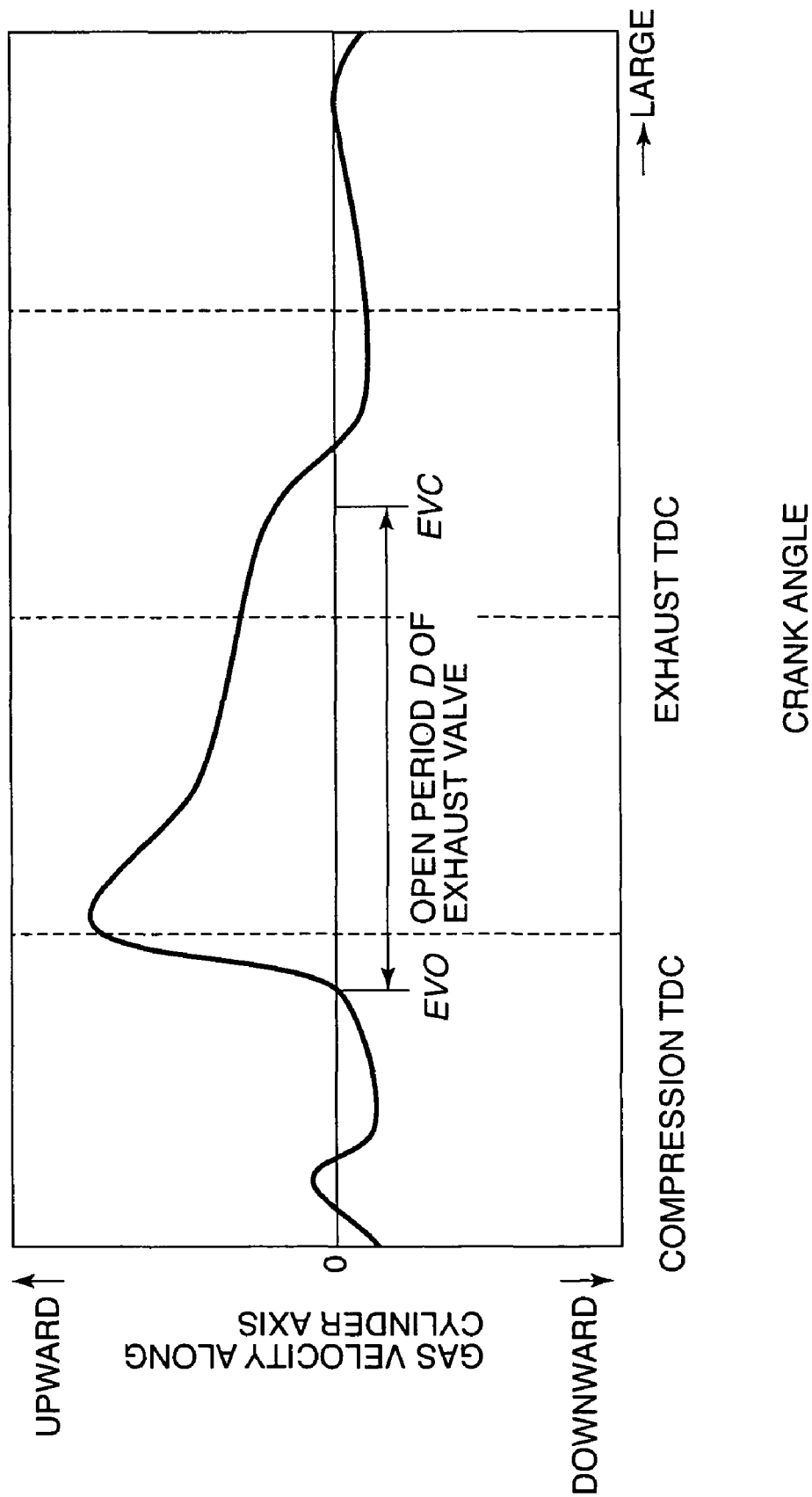
FIG. 3 is a diagram showing a result of analysis conducted by the inventors with respect to gas velocity variation in the cylinder along a cylinder axis according to a crank angle of the diesel engine.

Referring to FIG. 3, the inventors have discovered that the gas velocity in the cylinder along the cylinder axis rapidly increases as the exhaust valve 15 of the diesel engine 10 opens. When the exhaust valve 15 opens, exhaust gas is expelled from the combustion chamber to the exhaust port 16 by the ascending piston 10a. Herein, the gas velocity in the cylinder along the cylinder axis corresponds to a velocity of gas in the vicinity of the exhaust valve 15, which is close to a cylinder head of the diesel engine 10.

Figure 4:
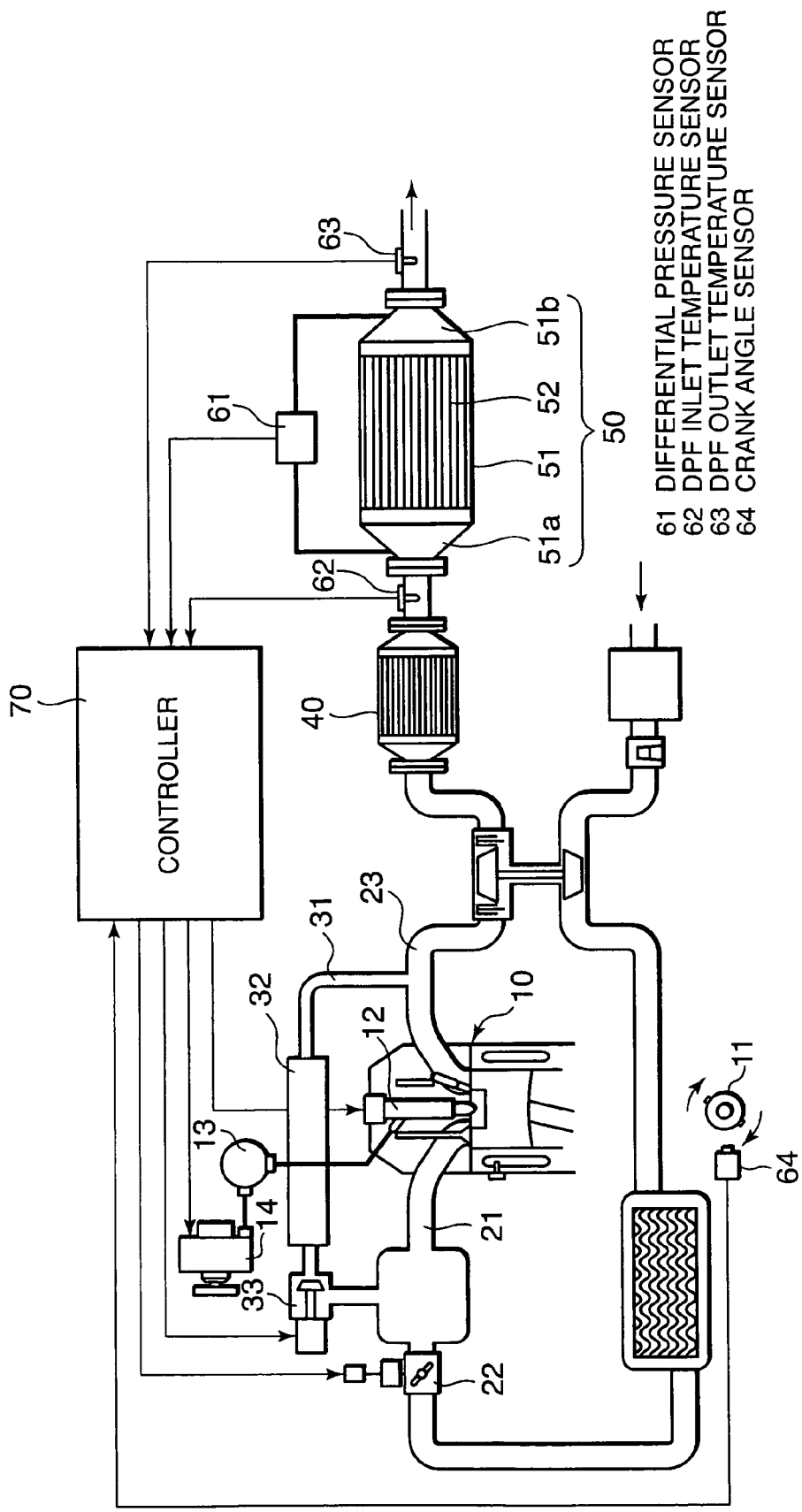
FIG. 4 is a schematic diagram of a fuel injection control device for a diesel engine according to this invention.

Referring to FIG. 4, the diesel engine 10 for a vehicle to which this invention is applied comprises an intake passage 21, a fuel injector 12, an exhaust passage 23 and an exhaust gas recirculation (EGR) passage 30.

An electronic throttle 22 is installed in the intake passage 21.

The fuel injector 12 is connected to a common rail 13. Fuel for the diesel engine 10 is pressurized by a high pressure pump 14 and stored in the common rail 13. The fuel injector 12 injects this fuel into the combustion chamber of the diesel engine 10.

In the exhaust passage 23, a diesel oxidation catalyst (DOC) 40, and a DPF assembly 50 are installed. The DOC 40 is constituted by palladium, platinum, etc. The DOC 40 promotes oxidation of unburned fuel, or in other words the DOC 40 promotes oxidation of hydrocarbons (HC), and raises the temperature of the exhaust gas using heat generated by an oxidation reaction.

The DPF assembly 50 is located downstream of the DOC 40. The DPF assembly 50 comprises a DPF 52 accommodated in a DPF housing 51. The DPF 52 has a honeycomb structure made of a porous ceramic such as cordierite. Within the DPF 52, numerous flow paths are partitioned by porous thin walls disposed in a lattice-like pattern. The inlet and outlet of the flow paths are alternately plugged such that a flow path having an open inlet has a plugged outlet, and a flow path having a plugged inlet has an open outlet.

Exhaust gas enters the DPF 52 and flows downstream by passing through the porous thin walls partitioning the flow paths. Particulate matter contained in the exhaust gas is trapped by the porous thin walls, and a deposit of particulate matter is formed on the surface of the porous thin walls. A part of the trapped particulate matter burns in the DPF 52, but if a bed temperature of the DPF 52 is not high enough, the burned amount of particulate matter is small and the newly trapped amount of particulate matter surpasses the burned amount of particulate matter. If this state continues, the DPF 52 becomes clogged. It is therefore necessary to burn the particulate matter deposit forcibly by raising the temperature of the exhaust gas when the DPF 52 has trapped a considerable amount of particulate matter. This operation is known as regeneration of the DPF 52.

An EGR valve 33 is installed in the EGR passage 30 in order to regulate an exhaust gas recirculation flow rate.

The fuel injection amount and a fuel injection timing of the fuel injector 12, operation of the high pressure pump 14, an opening of the electronic throttle 22, and an opening of the EGR valve 33 are controlled by control signals respectively output from a programmable controller 70.

The controller 70 is constituted by a microcomputer comprising a central processing unit (CPU), a read-only memory (ROM), a random access memory (RAM), and an input/output interface (I/O interface). The controller may be constituted by a plurality of microcomputers.

In order to perform the above control, various detection data by the following sensors 61-64 are input into the controller 70 as signals via signal circuits.

A differential pressure sensor 61 detects a differential pressure between an upstream chamber 51a of the DPF housing 51, or in other words an inlet of the DPF 52, and a downstream chamber 51b of the DPF housing 51, or in other words an outlet of the DPF 52.

A DPF inlet temperature sensor 62 detects an inlet temperature Tin of the DPF 52. A DPF outlet temperature sensor 63 detects an outlet temperature Tout of the DPF 52.

A crank angle sensor 64 detects a rotation speed of a crank-shaft of the diesel engine 10.

With respect to regeneration of the DPF 52, the controller 70 estimates a current deposit amount PMa1 of particulate matter in the DPF 52 based on the differential pressure detected by the differential pressure sensor 61.

On the other hand, the controller 70 calculates a discharge amount PMa21 of particulate matter of the diesel engine 10 during a constant time interval up to the present time according to an operation state of the diesel engine 10, represented for example by the rotation speed and the fuel injection amount, by referring to a particulate matter discharge amount map stored in the ROM in advance.

The controller 72 calculates a bed temperature Tbed of the DPF 52 based on the inlet temperature Tin and the outlet temperature Tout of the DPF 52.

The controller 70 calculates a burned amount PMa22 of particulate matter in the DPF 52 during the constant time interval up to the present time from a deposit amount PMa2z of particulate matter, the bed temperature Tbedz of the DPF 52, and the inlet temperature Tinz of the DPF 52, which were calculated at the beginning of the constant time interval, by referring to a particulate matter combustion amount map stored in the ROM in advance.

The controller 70 adds a value obtained by subtracting the burned amount PMa22 from the discharge amount PMa21 to the deposit amount PMa2z of particulate matter at the beginning of the constant time interval in order to obtain a current deposit amount PMa2 of particulate matter in the DPF 52.

The controller 70 then determines the DPF regeneration timing based on the two values PMa1 and PMa2 representing the current deposit amount of particulate matter in the DPF 52.

The controller 70 regulates an excess air factor of the air-fuel mixture that is burned in the diesel engine 10 through control of the fuel injection amount and fuel injection timing of the fuel injector 12, the opening of the electric throttle 22, and the opening of the EGR valve 33. This control is known as λ-control.

The controller 70 regulates the amount of unburned fuel in the exhaust gas, in other words the amount of hydrocarbons (HC) in the exhaust gas through λ-control in order to raise the temperature of the exhaust gas to regenerate the DPF 52 when required.

In addition to the above control, the controller 70 performs control of a transmission of the vehicle so as to apply an optimum gear for driving the vehicle, based on a running condition of the diesel engine 1. Related to this control, the controller 70 calculates the running speed of the vehicle by multiplying the engine rotation speed by the gear ratio of the applied gear. The running distance of the vehicle is also calculated by accumulating the running speed of the vehicle.

Figure 6:
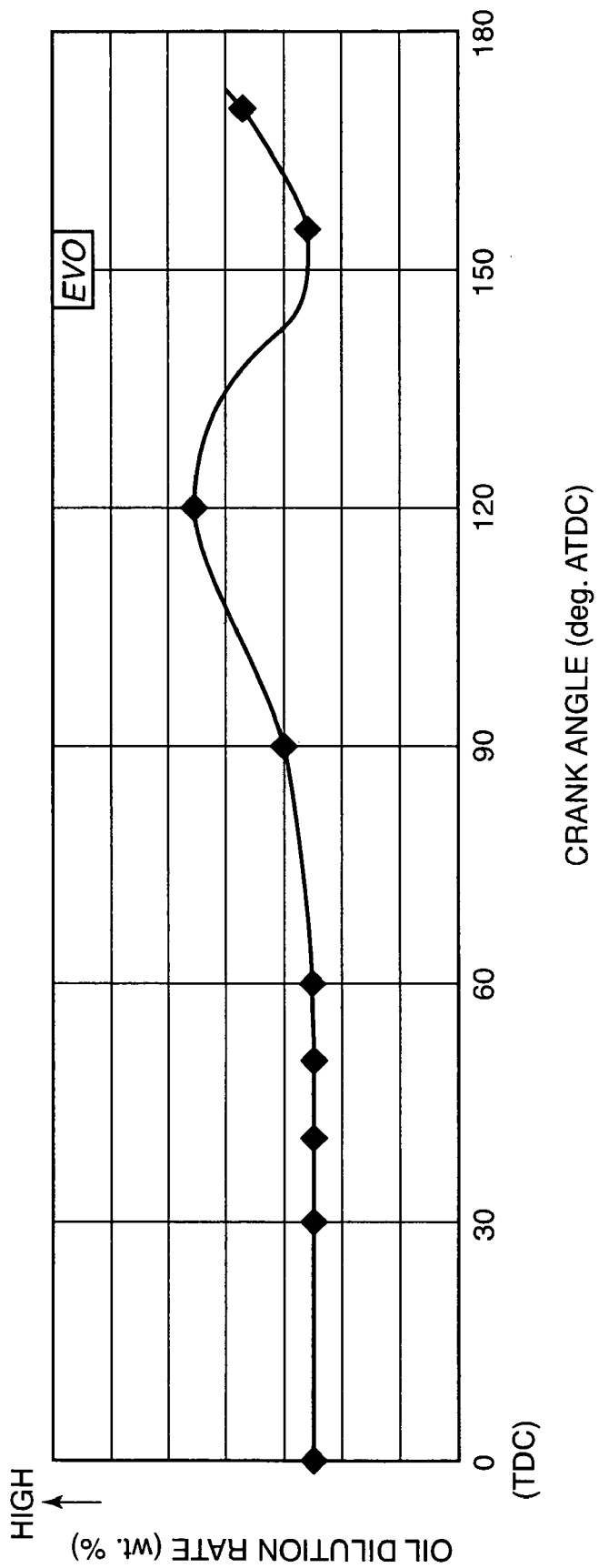
FIG. 6 is a diagram showing the relationship between an oil dilution rate and a post injection timing.

Referring now to FIGS. 5A, 5B and FIG. 6, a post injection timing of the fuel injector 12 according to this invention will be described.

Referring to FIGS. 5A and 5B, first, this invention starts the post injection at a timing where the gas velocity in the direction of the cylinder axis reaches a maximum value after an opening timing EVO of the exhaust valve 15. Specifically, the controller 70 causes the fuel injector 12 to start the post injection within a crank angle range of 0-30 degrees from the opening timing EVO of the exhaust valve 15. It is preferable to start the post injection in this condition irrespective of the engine rotation speed. The duration t of the post injection is determined using the following equation (2):

$$t < \frac{L}{C} \cdot \sqrt{\frac{\rho_f}{2 \cdot \Delta P}}$$

where, t=duration of post injection;
L=breakup length;
C=velocity coefficient;
ΔP=differential pressure between interior and exterior of injection hole; and
$\rho f$=density of fuel.

As explained heretofore, the differential pressure ΔP between the interior and exterior of the injection hole depends on the internal pressure of the cylinder, which varies according to the crank angle. The differential pressure ΔP between the interior and exterior of the injection hole is therefore regarded as a function of the crank angle. With respect to the breakup length L, the amount of fuel adhered to the cylinder liner 19c increases rapidly when the breakup length L has become longer than the distance S from the injection hole 12a to the cylinder liner 10c shown in FIG. 1.

Hence, by setting the duration of the post injection to satisfy the equation (2) after determining the crank angle at which the post injection is performed and setting the breakup length L to be equal to or shorter than the distance S, the fuel injected from the fuel injector 12 breaks up and atomizes before it reaches the cylinder liner 10c, and a situation where the injected fuel adheres to the cylinder liner 10c is realized.

Referring to FIG. 6, if fuel injection is performed when the piston is in the vicinity of compression top dead center, for example in a crank angle range of 0-60 degrees from compression top dead center, the fuel is injected into the cavity 10b formed on the crown portion of the piston 10a, and is therefore unlikely to adhere to the cylinder liner 10c. As a result, dilution of the engine oil by the injected fuel does not occur. However, a post injection performed in this crank angle range does not contribute to regeneration of the DPF 52.

On the other hand, if the post injection timing is retarded from this crank angle range, for example to a point 120 degrees after compression top dead center, most of the injected fuel adheres to the cylinder liner 10c, and the dilution rate of the engine oil in the oil pan increases.

This invention performs a post injection at a timing when the gas velocity in the cylinder along the cylinder axis reaches a maximum after the opening timing EVO of the exhaust vale 15, for example, within a crank angle range of 0-30 degrees from the opening timing EVO of the exhaust valve 15. According to this arrangement, the fuel injected in the post injection is encouraged to flow out through the exhaust valve 15 taking advantage of the gas velocity in the cylinder along the cylinder axis. Also, by setting the duration t of post injection to a value which satisfies the equation (2), the fuel injected in the post injection breaks up and atomizes before it reaches the cylinder liner 10c.

According to this invention, therefore, the fuel injected in the post injection is efficiently prevented from adhering to the cylinder liner 10c.

Figure 7A:
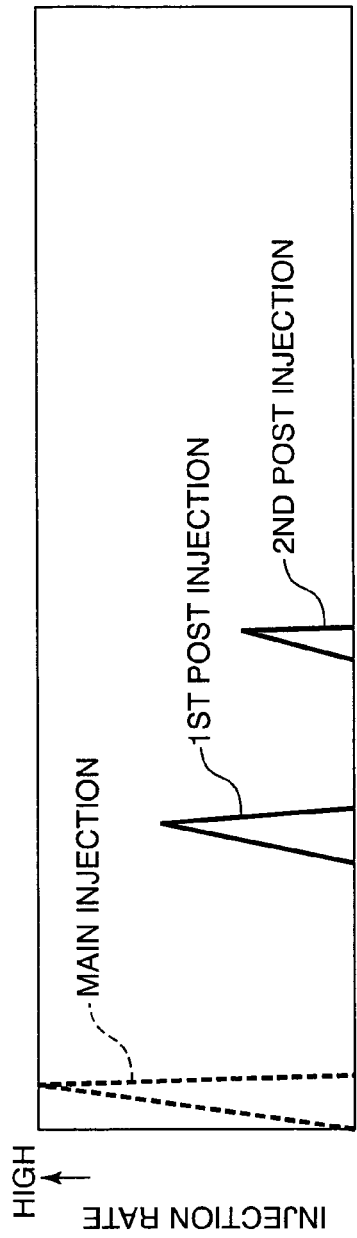
FIGS. 7A and 7B are similar to FIGS. 5A and 5B, but show a second embodiment of this invention.
Figure 7B:
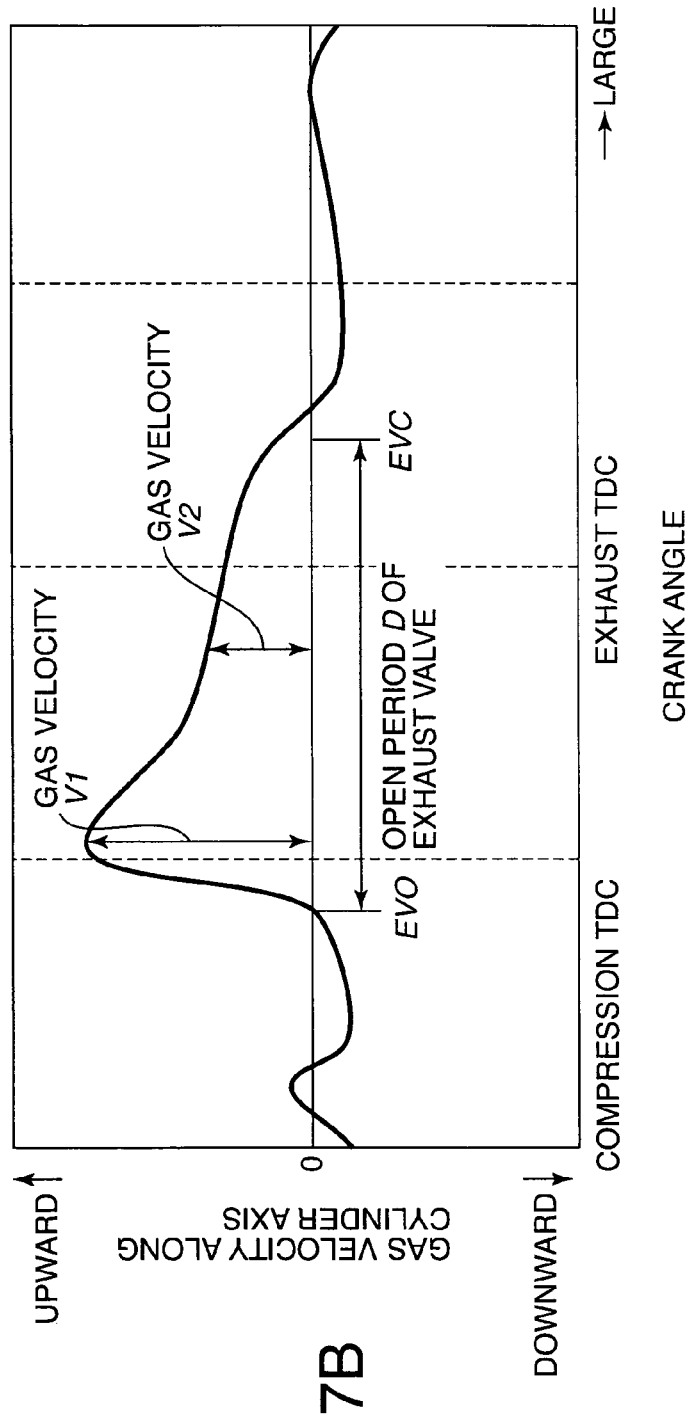

Referring to FIGS. 7A and 7B, a second embodiment of this invention will be described.

In the first embodiment of this invention, the post injection timing is set within a crank angle range of 0-30 degrees from the opening timing EVO of the exhaust valve 15 and the duration t of the post injection is set to a value which satisfies the equation (2).

In a certain case, however, it may be necessary to inject a large amount of fuel in the post injection, depending on the regeneration conditions of the DPF 52.

This embodiment prevents fuel injected in a post injection in the condition described above from adhering to the cylinder liner 10c.

According to this embodiment, several post injections are performed such that the amount of fuel injected in the post injection increases. The durations t of the respective post injections are set at values which respectively satisfy the equation (2).

The gas velocity in the cylinder along the cylinder axis reaches a maximum immediately after the opening timing EVO of the exhaust valve 15 and then starts to decrease as shown in FIG. 3. As the gas velocity decreases, the amount of fuel flowing out from the exhaust port also decreases. When several post injections are performed, the fuel amount for each post injection is preferably set based on the magnitude of the gas velocity at each injection timing. Specifically, for a first post injection performed immediately after the opening timing EVO of the exhaust valve 15 a considerably large fuel injection amount Q1 is set, and for a second post injection performed after the first post injection, a smaller fuel injection amount Q2 is set. Therefore, Q2<Q1.

According to this embodiment, the fuel injected in the second post injection is also prevented from adhering to the cylinder liner 10c and swept away through the exhaust port 16 by the gas flow generated in the cylinder along the cylinder axis. According to this embodiment, therefore, the amount of fuel injected in the post injection can be increased without risking the injected fuel adhering to the cylinder liner 10c.

Referring to FIGS. 9A, 9B and FIG. 10, a third embodiment of this invention will be described.

The aforesaid equation (1) expresses the fact that the breakup length L is the distance from the fuel injector 12 to a point at which the injected fuel atomizes. However, according to the research conducted by the inventors, the breakup length L can be longer than that defined by the equation (1) if the post injection is performed repeatedly.

Figure 9:
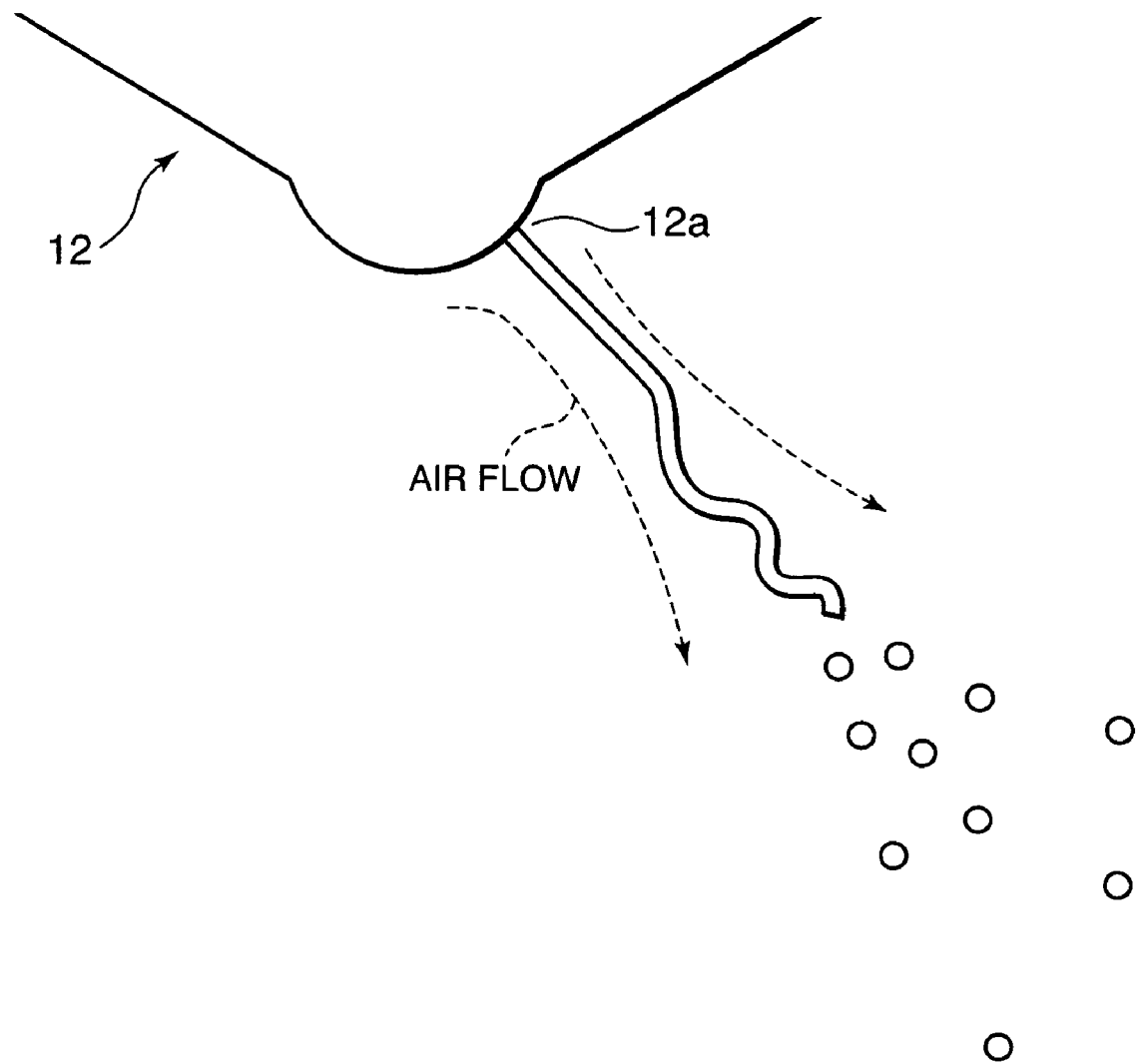
FIG. 9 is a diagram describing flow of air generated by fuel injected by a fuel injector into a cylinder.

Referring to FIG. 9, first a flow of air is generated around the fuel injected from the injection hole 12a due to friction between the injected fuel and air. When the post injection is performed repeatedly, the fuel injected in the second post injection or later may be carried further downstream with the assistance of the flow of air generated in the previous post injection, thereby increasing the breakup length L.

If the fuel injector 12 performs the post injection repeatedly in a four-stroke cycle, therefore, it is preferable that the interval between the post injections is set to a large value.

Referring to FIGS. 8A and 8B, according to this embodiment, the first post injection is performed at the opening timing EVO of the exhaust valve 15 and the third post injection is performed at a closing timing EVC of the exhaust valve 15. The second post injection is performed at a midpoint of an open period D of the exhaust valve 15 between the opening timing EVO to the closing timing EVC.

According to this embodiment, since the post injection interval is set to be as large as possible, the effect of the flow of air generated during the previous post injection is minimized and the breakup length L is prevented from increasing even in the second and third post injections, thereby preventing the fuel injected in the post injections from adhering to the cylinder liner 10c.

According to this embodiment, therefore, the amount of fuel injected in the post injection can be further increased with respect to the second embodiment.

The contents of Tokugan 2005-360463, with a filing date of Dec. 14, 2005 in Japan, are hereby incorporated by reference.

Although the invention has been described above with reference to certain embodiments of the invention, the invention is not limited to the embodiments described above. Modifications and variations of the embodiments described above will occur to those skilled in the art, within the scope of the claims.

For example, in the embodiments described above, this invention is applied to the diesel engine 10, but the post injection control according to this invention can also be applied to an engine which uses gasoline as fuel.

The embodiments of this invention in which an exclusive property or privilege is claimed are defined as follows:

What is claimed is:

1. A fuel injection control device for use with an internal combustion engine, the engine comprising a fuel injector which performs a post injection after performing a main injection into a cylinder and an exhaust valve which opens and closes to discharge an exhaust gas, the control device comprising:
    a programmable controller programmed to:
    determine a duration of the post injection using the following equation:

$$t < \frac{L}{C} \cdot \sqrt{\frac{\rho_f}{2 \cdot \Delta P}}$$

where, t=duration of post injection;
   L=breakup length=distance from injection hole to wall surface of the cylinder;
   C=velocity coefficient;
   ΔP=differential pressure between interior and exterior of injection hole; and
   ρf=density of fuel; and
   control the fuel injector to start the post injection during a period where a gas velocity in the cylinder along a cylinder axis increases after the exhaust valve opens and continue the post injection during the determined duration of the post injection.

2. A fuel injection control device for use with an internal combustion engine, the engine comprising a fuel injector which performs a post injection after performing a main injection into a cylinder and an exhaust valve which opens and closes to discharge an exhaust gas, the control device comprising:
    a programmable controller programmed to:
    determine a duration of the post injection based on a distance from an injection hole of the fuel injector to a wall surface of the cylinder in a direction of fuel injection, and a differential pressure between an interior and an exterior of the injection hole;
    wherein the differential pressure between the interior and the exterior of the injection hole is a value determined according to a crank angle of the engine and the controller is further programmed to calculate the duration of the post injection based on a crank angle at which the post injection is to be performed.

* * * * *